UNITED STATES PATENT OFFICE.

CONRAD SCHRAUBE AND WALTER VOIGTLÄNDER-TETZNER, OF LUDWIGS-HAFEN-ON-THE-RHINE, GERMANY, ASSIGNORS TO BADISCHE ANILIN AND SODA FABRIK, OF LUDWIGSHAFEN-ON-THE-RHINE, GERMANY, A CORPORATION OF GERMANY.

MIXED DISAZO DYE AND PROCESS OF MAKING SAME.

SPECIFICATION forming part of Letters Patent No. 718,028, dated January 6, 1903.

Application filed November 6, 1900. Serial No. 35,666. (Specimens.)

*To all whom it may concern:*

Be it known that we, CONRAD SCHRAUBE, doctor of philosophy, a subject of the King of Prussia, German Emperor, and WALTER VOIGTLÄNDER-TETZNER, doctor of philosophy, a subject of the King of Saxony, both residing at Ludwigshafen-on-the-Rhine, in the Kingdom of Bavaria and Empire of Germany, have invented new and useful Improvements in Mixed Disazo Coloring-Matters, of which the following is a specification.

The tetrazo compound of 1.5 naphthylene-diamin has prior to our invention only been used for the manufacture of a series of substantive azo coloring-matters for cotton. We have discovered that the mixed disazo dyes that can be obtained from this tetrazo compound and which contain salicylic acid as one component are excellent dyes for use in connection with metallic mordants on wool. These dyestuffs have the formula $$C_{10}H_6 \underset{(5)}{\overset{(1)}{<}} \begin{matrix} N=N-C_6H_3 < \begin{matrix} OH \\ COOH \end{matrix} \\ N=N-Y \end{matrix}$$

where Y denotes an azo component other than salicylic acid. We have further found that these coloring-matters can best be manufactured by combining one molecular proportion of the tetrazo compound with one molecular proportion of salicylic acid in alkaline solution and subsequently combining the intermediate product thus obtained, which still contains a free disazo residue, with the final component chosen. The final component selected mainly influences the shade of the product obtained. This intermediate compound is of great utility for the manufacture of mixed disazo dyes and has hitherto not been used for the purpose. Indeed, no mixed disazo dye from this diamin has hitherto attained any importance whatever.

The coloring-matters obtained in accordance with our invention can be used for dyeing chrome-mordanted wool or they can be dyed on wool in the acid-bath and subsequently suitably treated with a chromate or a suitable chrome-oxid salt. In either case the dyeings possess a high degree of fastness against fulling.

The following examples will serve to illustrate the manner in which our invention can best be carried into practical effect. The parts are by weight.

Example 1: Production of the coloring-matter—

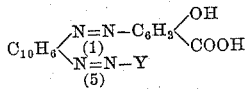
1.5 naphthylene-diamin$<$ salicylic acid / 2.3.6 naphthol-disulfo-acid (sodium salt.)

Prepare the tetrazo solution from two hundred and thirty (230) parts of 1.5 naphthylene-diamin hydrochlorate, which may be done in the well-known way. (See German Patent No. 39,954.) Run this into a solution of one hundred and thirty-eight (138) parts of salicylic acid in five thousand (5,000) parts of water containing eight hundred (800) parts of calcined soda. Stir the solutions thoroughly while adding the one to the other and for about a quarter ($\frac{1}{4}$) of an hour after. By this time the intermediate product is usually formed and no unchanged tetrazo compound should be present. The mixture thus obtained contains in suspension the intermediate product from one hundred and fifty-eight (158) parts free 1.5 naphthylene-diamin and one hundred and thirty-eight (138) parts of salicylic acid. To this mixture add about three hundred and fifty (350) parts of 2.3.6 naphthol-disulfo-acid (sodium salt) dissolved in three thousand (3,000) parts of water. Stir for several hours. The coloring-matter separates out or can be precipitated by common salt and collected in the usual way.

Example 2: Production of the coloring-matter—

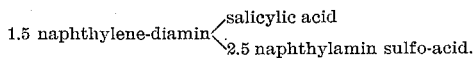

Run the tetrazo solution from two hundred and thirty (230) parts of 1.5 naphthylene-diamin hydrochlorate into a solution of one hundred and thirty-eight (138) parts of salicylic acid in five thousand (5,000) parts of water containing six hundred and thirty (630) parts of calcined soda. Stir the mixture thoroughly until the tetrazo compound has disappeared. Then add sufficient acetic acid to render the solution weakly acid. Then run in a solution of two hundred and twenty-three (223) parts of 2.5 naphthylamin sulfo-acid in three thousand (3,000) parts of water containing one hundred and forty (140) parts of crystallized sodium acetate. Stir the mixture for about twelve (12) hours. Then add carbonate of soda until the reaction is alkaline, precipitate the coloring-matter by means of common salt, and collect it by filtering.

Example 3: Production of the coloring-matter—

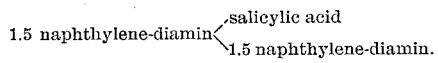

Prepare the intermediate product from two hundred and thirty (230) parts of 1.5 naphthylene-diamin hydrochlorate, one hundred and thirty-eight (138) parts of salicylic acid in the manner described in Example 2. Add sufficient hydrochloric acid to the mixture to render it weakly acid, and then add an aqueous solution of two hundred and thirty-two (232) parts of 1.5 naphthylene-diamin hydrochlorate. Stir until the combination is complete, add carbonate of soda to render the solution alkaline, and collect the precipitated coloring-matter.

Similarly coloring-matters can be obtained by using any of the well-known azo-dye components, such as phenol, resorcinol, the sulfo-acids of naphthylamin, naphthol, amido-naphthol, dihydroxy-naphthalene, and the like.

Our new coloring-matters, that we desire to claim, are mixed disazo dyes, having the formula

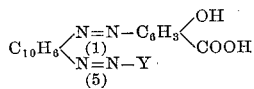

which upon reduction yield 1.5 naphthylene-diamin, amido-salicylic acid, and the reduction product due to the presence of the other component used. Thus the disazo dyes from the 1.5 naphthylene-diamin, salicylic acid, and a naphthol sulfo-acid yield upon reduction 1.5 naphthylene-diamin, amido-salicylic acid, and amido-naphthol sulfo-acid. If the naphthol sulfo-acid be the acid of the so-called "R. salt"—that is, 2.3.6 naphthol-disulfo-acid—then the reduction product due to the use of this acid is the corresponding 1.2 amido-naphthol-3-6-disulfo-acid.

The following table shows the dyeing properties of the principal members of our new group of coloring-matters.

| Final component of coloring-matter, (Y.) | Dyes wool from the acid-bath. | After treatment with bichromate. |
|---|---|---|
| Phenol | Olive-yellow | Yellow-brown. |
| Resorcinol | Brown-orange | Brown. |
| Meta-phenylene-diamin disulfo-acid. | Brown-yellow | Yellow-brown. |
| Meta-toluylene-diamin-monosulfo-acid. | Brown-orange | Brown. |
| 1.3.6 amido-phenol sulfo-acid. | Brownish orange | Brown. |
| 1.3.4 amido-phenol sulfo-acid. | Brown-yellow | Yellow-brown. |
| 1.4 naphthylamin sulfo-acid | Brownish red | Brown-red. |
| 2.5 naphthylamin sulfo-acid | Brownish orange | Orange-brown. |
| 2.6 naphthylamin sulfo-acid | Brownish orange | Orange-brown. |
| 1.3.6 naphthylamin disulfo-acid. | Dull reddish brown. | Yellow-brown. |
| 1.5.7 naphthylamin disulfo-acid. | Dull reddish brown. | Yellow-brown. |
| 2.3.6 naphthylamin disulfo-acid. | Brown-orange | Orange-brown. |
| 2.5.7 naphthylamin disulfo-acid. | Brown-orange | Brown-orange. |
| 2.6.8 naphthylamin disulfo-acid. | Dull brown | Yellow-brown. |
| 1.4 naphthol sulfo-acid | Red | Brown-red. |
| 2.6 naphthol sulfo-acid | Red | Brown-red. |
| 1.4.7 naphthol disulfo-acid | Red | Brown. |
| 1.4.8 naphthol disulfo-acid | Red | Brown. |
| 2.3.6 naphthol disulfo-acid | Blue-red | Brown-violet. |
| 1.5 napththylene-diamin sulfo-acid. | Brown | Brown. |
| 1.5 naphthylene-diamin | Dull brown | Brown. |
| 1.5.7 amido-naphthol sulfo-acid, (combined in alkaline solution.) | Violet | Violet-brown. |
| 1.5.7 amido-naphthol sulfo-acid, (combined in acid solution.) | Brown-violet | Brown. |
| 1.8.4 amido-naphthol sulfo-acid, (combined in acid solution.) | Violet | Olive-brown. |
| 1.8.5 amido-naphthol sulfo-acid, (combined in alkaline solution.) | Reddish blue | Olive-brown. |
| 2.5.7 amido-naphthol sulfo-acid, (combined in alkaline solution.) | Red | Sad red. |
| 2.5.7 amido-naphthol sulfo-acid, (combined in acid solution.) | Brownish red | Red-brown. |
| 2.8.6 amido-naphthol sulfo-acid, (combined in alkaline solution.) | Brown-violet | Brown. |
| 2 8.6 amido-naphthol sulfo-acid, (combined in acid solution.) | Brown-red | Brown. |
| 1.8.4 dihydroxy-naphthalene sulfo-acid. | Violet | Olive-brown. |

Now what we claim is—

1. The process for the manufacture of mixed disazo coloring-matters by converting 1.5 naphthylene-diamin into its tetrazo compound and combining one molecular proportion of this tetrazo compound with one molecular proportion of salicylic acid and subsequently combining the intermediate product thus obtained with an azo component other than salicylic acid, all substantially as described.

2. As a new article of manufacture a mixed disazo coloring-matter which dyes chrome-mordanted wool yielding shades which possess a high degree of fastness against fulling and which upon reduction yields 1.5 naphthylene-diamin, amido-salicylic acid, and a reduction product due to the azo component other than salicylic acid chosen, all substantially as described.

3. As a new article of manufacture a mixed disazo coloring-matter of the formula

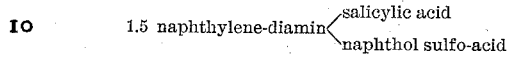

which dyes chrome-mordanted wool yielding shades which possess a high degree of fastness against fulling and which upon reduction yields 1.5 naphthylene-diamin, amido-salicylic acid and an amido-naphthol sulfo-acid, substantially as described.

4. As a new article of manufacture the mixed disazo coloring-matter of the formula

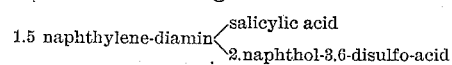

which dyes chrome-mordanted wool yielding shades which possess a high degree of fastness against fulling and which upon reduction yields 1.5 naphthylene-diamin, amido-salicylic acid and 1.2 amido-naphthol-3.6-disulfo-acid, substantially as described.

In testimony whereof we have hereunto set our hands in the presence of two subscribing witnesses.

CONRAD SCHRAUBE.
WALTER VOIGTLÄNDER-TETZNER.

Witnesses:
ERNEST F. EHRHARDT,
PERCY J. JONES.